US011403090B2

(12) United States Patent
Fang et al.

(10) Patent No.: US 11,403,090 B2
(45) Date of Patent: Aug. 2, 2022

(54) METHOD AND SYSTEM FOR COMPILER OPTIMIZATION BASED ON ARTIFICIAL INTELLIGENCE

(71) Applicant: ALIBABA GROUP HOLDING LIMITED, Grand Cayman (KY)

(72) Inventors: Yuanwei Fang, Sunnyvale, CA (US); Yen-kuang Chen, Palo Alto, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 17/115,139

(22) Filed: Dec. 8, 2020

(65) Prior Publication Data

US 2022/0179635 A1    Jun. 9, 2022

(51) Int. Cl.
| | |
|---|---|
| *G06F 8/65* | (2018.01) |
| *G06F 8/41* | (2018.01) |
| *G06N 3/04* | (2006.01) |
| *G06F 9/455* | (2018.01) |
| *G06N 3/08* | (2006.01) |
| *G06F 11/34* | (2006.01) |

(52) U.S. Cl.
CPC ............... *G06F 8/65* (2013.01); *G06F 8/44* (2013.01); *G06F 8/443* (2013.01); *G06F 9/45525* (2013.01); *G06F 9/45529* (2013.01); *G06F 11/3466* (2013.01); *G06N 3/04* (2013.01); *G06N 3/08* (2013.01)

(58) Field of Classification Search
CPC ............... G06F 8/41–49; G06F 8/65; G06F 21/57–577; G06F 9/45525; G06F 9/45529; G06F 11/3409; G06F 11/3452; G06F 11/3466; G06N 3/02; G06N 3/04; G06N 3/08

USPC .................................... 717/140–161
See application file for complete search history.

(56) References Cited

U.S. PATENT DOCUMENTS

| | | | |
|---|---|---|---|
| 7,996,827 B2 | 8/2011 | Vorbach et al. | |
| 8,869,121 B2 | 10/2014 | Vorbach et al. | |
| 9,152,531 B2 | 10/2015 | Hecht et al. | |
| 9,218,574 B2 | 12/2015 | Phillipps et al. | |
| 9,349,006 B2 | 5/2016 | Zhou et al. | |
| 9,378,014 B2 | 6/2016 | Wilson et al. | |

(Continued)

OTHER PUBLICATIONS

Ashouri, A., et al., A Survey on Compiler Autotuning using Machine Learning, ACM Computing Surveys, vol. 51, Issue 5, Sep. 2019, pp. 1-42, [retrieved on Jan. 8, 2022], Retrieved from the Internet: <URL:http://dl.acm.org/>.*

(Continued)

*Primary Examiner* — Geoffrey R St Leger

(57) ABSTRACT

This application describes methods, systems, and apparatus, including computer programs encoded on computer storage media, of an AI-assisted compiler. An example method includes obtaining intermediate code and executable code generated by compiling a computer program with a compiler; determining a reward based on one or more traces obtained by executing the executable code in a runtime system; generating an embedding vector based on the intermediate code and the one or more traces to represent code execution states; determining, using a reinforcement learning agent, one or more optimization actions based on the embedding vector and the reward; and updating the compiler by applying the one or more optimization actions.

20 Claims, 7 Drawing Sheets

(56) References Cited

U.S. PATENT DOCUMENTS

| | | | |
|---|---|---|---|
| 9,646,262 | B2 | 5/2017 | Phillipps et al. |
| 9,767,013 | B1* | 9/2017 | Brezinski ................ G06F 21/52 |
| 9,800,466 | B1* | 10/2017 | Rangole ............. H04L 41/0816 |
| 10,127,022 | B2 | 11/2018 | Sharma et al. |
| 10,157,045 | B2 | 12/2018 | Venkataramani et al. |
| 2005/0114849 | A1* | 5/2005 | Megiddo ................ G06F 8/443 717/151 |
| 2007/0044066 | A1 | 2/2007 | Meijer et al. |
| 2014/0180738 | A1 | 6/2014 | Phillipps et al. |
| 2014/0195466 | A1 | 7/2014 | Phillipps et al. |
| 2015/0363196 | A1 | 12/2015 | Carback, III et al. |
| 2018/0293463 | A1 | 10/2018 | Brown |
| 2018/0293517 | A1 | 10/2018 | Browne et al. |
| 2019/0095796 | A1* | 3/2019 | Chen ...................... G06N 3/084 |
| 2019/0370649 | A1* | 12/2019 | Burhani ................ G06Q 40/04 |
| 2020/0293295 | A1* | 9/2020 | Gao .................... G06F 11/3065 |
| 2020/0326934 | A1* | 10/2020 | Tepper .................... G06F 8/433 |
| 2021/0287108 | A1* | 9/2021 | Hwang ............... G06F 11/3419 |

OTHER PUBLICATIONS

Huang, Q., et al., AutoPhase: Compiler Phase-Ordering for HLS with Deep Reinforcement Learning, 2019 IEEE 27th Annual International Symposium on Field-Programmable Custom Computing Machines (FCCM), Apr. 28-May 1, 2019, p. 308, [retrieved on Jan. 11, 2022], Retrieved from the Internet: <URL:http://ieeexplore.ieee.org/>.*

Brauckmann, A., et al., Compiler-Based Graph Representations for Deep Learning Models of Code, CC 2020: Proceedings of the 29th International Conference on Compiler Construction, Feb. 2020, pp. 201-211, [retrieved on Jan. 10, 2022], Retrieved from the Internet: <URL:http://dl.acm.org/>.*

Wang, Z., et al., Machine Learning in Compiler Optimization, Proceedings of the IEEE (vol. 106, Issue: 11, Nov. 2018), pp. 1879-1901, [retrieved on Jan. 10, 2022], Retrieved from the Internet: <URL:http://ieeexplore.ieee.org/>.*

Leather, H., et al., Machine Learning in Compilers: Past, Present and Future, 2020 Forum for Specification and Design Languages (FDL), Sep. 15-17, 2020, 8 pages, [retrieved on Jan. 11, 2022], Retrieved from the Internet: <URL:http://ieeexplore.ieee.org/>.*

Haj-Ali, A., et al., NeuroVectorizer: End-to-End Vectorization with Deep Reinforcement Learning, CGO 2020: Proceedings of the 18th ACM/IEEE International Symposium on Code Generation and Optimization, Feb. 2020, pp. 242-255, [retrieved on Jan. 11, 2022], Retrieved from the Internet: <URL:http://dl.acm.org/>.*

Wu, J., et al., Reliable Compilation Optimization Phase-ordering Exploration with Reinforcement Learning, 2020 IEEE International Conference on Systems, Man, and Cybernetics (SMC), Oct. 11-14, 2020, pp. 4058-4065, [retrieved on Jan. 10, 2022], Retrieved from the Internet: <URL:http://ieeexplore.ieee.org/>.*

Mammadli, R., et al., Static Neural Compiler Optimization via Deep Reinforcement Learning, 2020 IEEE/ACM 6th Workshop on the LLVM Compiler Infrastructure in HPC (LLVM-HPC), Nov. 12-12, 2020, pp. 1-11, [retrieved on Jan. 10, 2022], Retrieved from the Internet: <URL:http://ieeexplore.ieee.org/>.*

* cited by examiner

500

510 obtaining intermediate code and executable code generated by compiling a computer program with a compiler 520 receiving, from a runtime system, one or more traces obtained by executing the executable code in the runtime system 530 determining a reward based on the one or more traces 540 generating an embedding based on the intermediate code and the one or more traces to represent code execution states 550 determining, using a reinforcement learning agent, one or more optimization actions based on the embedding and the reward 560 updating the compiler by applying the one or more optimization actions

FIG. 5

METHOD AND SYSTEM FOR COMPILER OPTIMIZATION BASED ON ARTIFICIAL INTELLIGENCE

TECHNICAL FIELD

The disclosure relates generally to compilers. More specifically, this disclosure is related to a method and system of optimizing compiler for compiling computer programs based on artificial intelligence (AI).

BACKGROUND

Machine learning and artificial intelligence are rapidly growing fields of research that have profound impacts across many fields of science and engineering. In the past decades, machine learning frameworks have been embraced by areas like speech recognition, computer vision, machine translation, and so on. However, machine learning-based computer program compilation has just started to attract attention. Compilers are used to convert computer programs written in high-level programming languages into code executable by computer hardware. The tasks performed by the compilers involve translation (e.g., correctness) and optimization (efficiency). Existing compiler optimization techniques generally use rule-based optimization, which is inflexible and inefficient.

SUMMARY

Various embodiments of the present specification may include systems, methods, and non-transitory computer-readable media of an AI-assisted compiler for compiling computer programs.

According to one aspect, a method for AI-assisted compilers may include: obtaining intermediate code and executable code generated by compiling a computer program with a compiler; determining a reward based on one or more traces obtained by executing the executable code in a runtime system; generating an embedding vector based on the intermediate code and the one or more traces to represent code execution states; determining, using a reinforcement learning agent, one or more optimization actions based on the embedding vector and the reward; and updating the compiler by applying the one or more optimization actions.

In some embodiments, the compiler includes a plurality of interfaces, and the updating the compiler includes: triggering one or more of the plurality of interfaces to apply the one or more optimization actions to the compiler.

In some embodiments, the generating the embedding vector based on the intermediate code and the one or more traces includes: generating a graph representation of the intermediate code; learning code dependencies based on the graph by a Graph Neural Network (GNN); and generating the embedding vector based on the code dependencies and the one or more traces to represent the code execution states.

In some embodiments, the generating the embedding vector based on the code dependencies and the one or more traces includes: generating one or more sequence vectors based on the code dependencies and the one or more traces; inputting the one or more sequence vectors into a Sequence Model to generate the embedding vector.

In some embodiments, the runtime system is implemented in at least one of the following: a computing device with an operating system, a virtual machine, a cloud-native compiler-as-a-service platform, or a feedback-driven optimization compiler framework.

In some embodiments, the each of the one or more traces includes one or more metrics including at least one of the following: cycles per instruction (CPI), execution time, or miss per accruing instruction.

In some embodiments, the obtaining intermediate code and executable code includes: generating the intermediate code based on the computer program; obtaining a tree representation of the intermediate code; and generating the executable code by optimizing the tree representation.

In some embodiments, the obtaining intermediate code and executable code includes obtaining the intermediate code and the executable code after the compiler compiling the computer program, and the method further includes triggering the updated compiler to re-compile the computer program.

In some embodiments, the computer program includes a plurality of sections, and the obtaining intermediate code and executable code includes obtaining the intermediate code and the executable code by compiling a first section of the computer program by the compiler, and the method further includes compiling a second section of the computer program with the updated compiler.

In some embodiments, the reinforcement learning agent trains an optimization policy for recommending optimization actions, and the method further includes: obtaining new executable code from the updated compiler; obtaining one or more new traces and a new reward by running the new executable code in the runtime system; and training the optimization policy based on the new reward and the one or more optimization actions.

According to other embodiments, a system includes one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to another aspect, a system of AI-assisted compilers may include one or more processors and one or more non-transitory computer-readable memories coupled to the one or more processors, the one or more non-transitory computer-readable memories storing instructions that, when executed by the one or more processors, cause the system to perform operations including: obtaining intermediate code and executable code generated by compiling a computer program with a compiler; determining a reward based on one or more traces obtained by executing the executable code in a runtime system; generating an embedding vector based on the intermediate code and the one or more traces to represent code execution states; determining, using a reinforcement learning agent, one or more optimization actions based on the embedding vector and the reward; and updating the compiler by applying the one or more optimization actions.

According to yet another aspect, a non-transitory computer-readable storage medium may store instructions that, when executed by one or more processors, cause the one or more processors to perform operations including: obtaining intermediate code and executable code generated by compiling a computer program with a compiler; determining a reward based on one or more traces obtained by executing the executable code in a runtime system; generating an embedding vector based on the intermediate code and the one or more traces to represent code execution states; determining, using a reinforcement learning agent, one or more optimization actions based on the embedding vector and the reward; and updating the compiler by applying the one or more optimization actions.

Embodiments disclosed in the specification have one or more technical effects. In some embodiments, the described method and system for optimizing an AI-assisted compiler may be platform-agnostic (e.g., cross different platforms). For example, the AI-assisted compiler may be implemented in a virtual machine (e.g., Java virtual machine (JVM)), a feedback directed optimization (FDO) compiler framework running on physical machines, or another suitable environment. In some embodiments, improvements to the compiler are learned based on reinforcement learning (RL), which fits seamlessly into the compiler optimization scenarios. For example, a described compiler optimization involves an iterative process that learns from periodical feedbacks from an environment running the executable code generated by the compiler and optimizes the compiler accordingly. Similarly, an RL agent in an RL framework may interact with the environment and adjust its action and/or reward policies based on the states and feedback/rewards of the environment, and recommend optimization actions. In some embodiments, the compiler exposes a plurality of interfaces, though one or more of which it interacts with the RL agent for implementing the recommended optimization actions. In comparison to traditional compilers merely allowing a limited number of on/off flags controlling the compilation algorithms, the AI-assisted compiler may expose interfaces for the RL agent to automatically optimize the compiler. This flexibility allows the AI-assisted compiler to be more dynamic and achieve better compilation results. In some embodiments, during the training process of the AI-assisted compiler, various rewards from the environment running the executable code may be factored in. Different rewards may indicate different focuses of the optimization. For example, some rewards (e.g., rewards based on cycle per instruction (CPI)) may focus on improving the execution time, while other rewards may focus on generated code size (e.g., when the executable code needs to be transmitted through a network connection or deployed in edge devices with limited space). Thus, the AI-assisted compiler may be configured to achieve different optimization goals.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, where like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 5 illustrates an example method of an AI-assisted compiler in accordance with some embodiments.

DETAILED DESCRIPTION

The specification is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

To tackle this disadvantages of current solutions, this specification describes an AI-assisted compiler that employs a reinforcement learning framework to learn the underlying patterns of computer program compilation and to optimize the compiler accordingly. Compiler optimizations improve the quality of the generated executable code without the need to change the original high-level source code. For example, when the optimizations are applied, the code generated by the optimized compiler may run faster or more efficiently on target runtimes. The embodiments described herein involve applying reinforcement learning (RL) in compiler optimization. RL is an area of machine learning inspired by behaviorist psychology and uses the notion of rewards or penalties so that a software agent interacts with an environment and maximizes its cumulative rewards. The training and testing phases in RL may be intertwined, which may also be referred to as a trial and error process. RL uses the Markov decision process (MDP) to adapt and interact with the environment.

Figure 1:
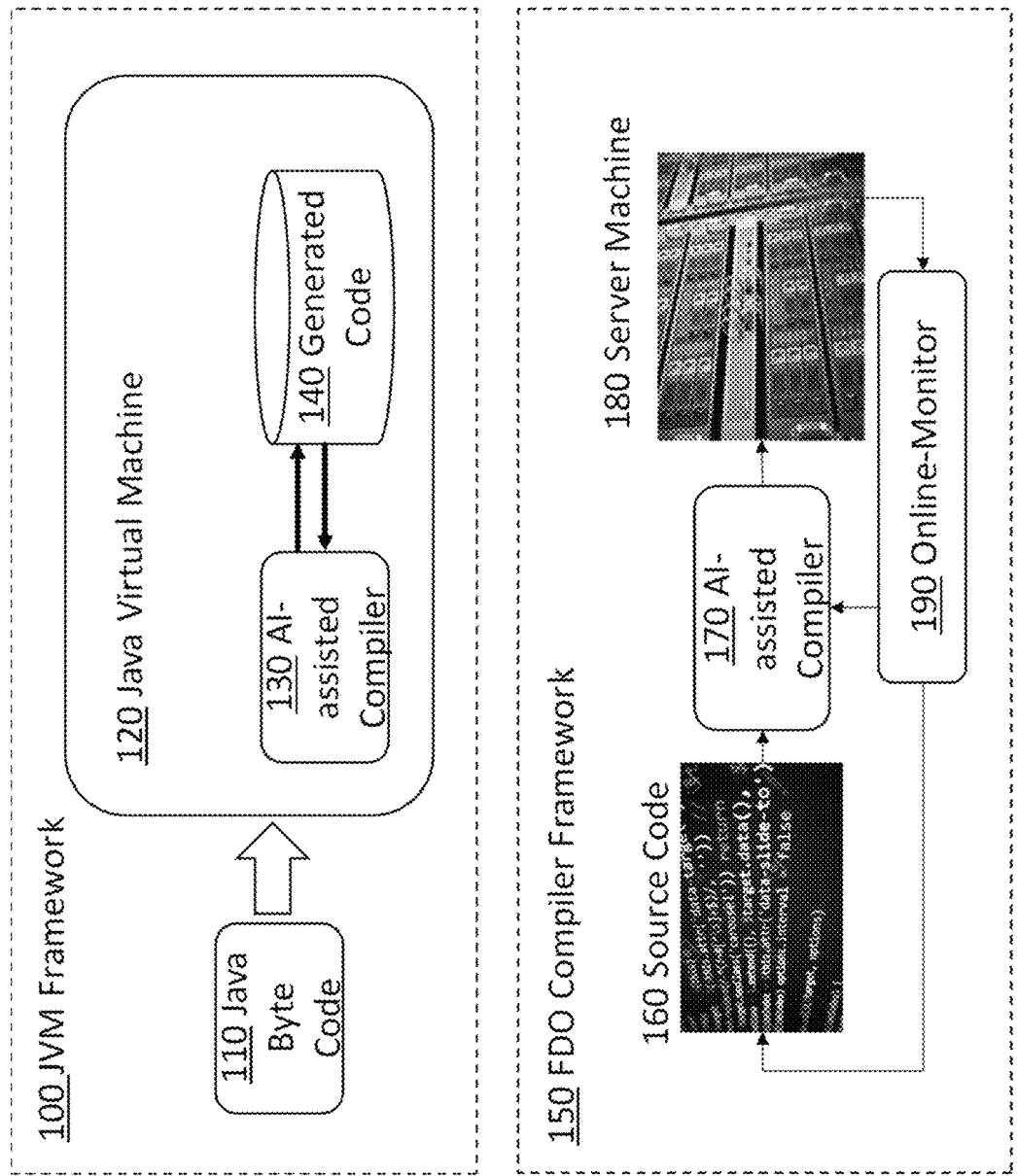
FIG. 1 illustrates exemplary environments in which AI-assisted compilers may be applied in accordance with some embodiments.

FIG. 1 illustrates example environments in which AI-assisted compilers may be applied in accordance with some embodiments. The two example environments illustrated in FIG. 1 include a Java virtual machine (JVM) framework 100 and a feedback-driven optimization (FDO) compiler framework 150. Depending on the actual application scenarios, the AI-assisted compilers may be implemented in other suitable environments, such as another suitable virtual machine, a physical machine, or a cloud-native compiler-as-a-service platform.

In the illustrated JVM framework 100, the java byte code 110 may be fed into the JVM 120 as an input. An AI-assisted compiler 130 deployed in the JVM 120 may compile the java byte code 110 and output the generated code 140, such as ".class" files, ".jar" files, or another suitable form of code that is executable by the JVM 120. In some embodiments, the generated code 140 may be executed by the JVM 120, and the execution may yield some traces. The traces may include performance metrics indicating the quality of the generated code 140. These performance metrics may include cycles per instruction (CPI), execution time, miss per a certain number of instructions (e.g., miss per kilo instructions), another suitable metric, or any combination thereof. In some embodiments, these performance metrics may be transformed into rewards by the runtime (e.g., the JVM 120) or by the AI-assisted compiler 130 for optimization. For example, the AI-assisted compiler 130 in some embodiments may include an RL agent learning an optimization policy for recommending and/or implementing optimization actions to improve the quality of the generated code 140. In this case, the rewards may be used by the RL agent to update the optimization policy, so that an effective optimization action (e.g., an optimization action contributed to the rewards) and similar actions have a higher probability to be recommended in the future, and an ineffective optimization action and similar actions have a lower probability to be recommended in the future.

In the illustrated FDO compiler framework 150, the source code 160 may be written in a high-level programming language, such as Java or C++. The server machine 180 may refer to a physical machine or a cluster of machines on which the compiled code the AI-assisted compiler 170 generated based on the source code 160 can run. The online monitor 190 may keep tracking the execution states of the compiled code on the server machine 180. In some embodiments, the online monitor 190 may collect traces from the execution states of the compiled code, and the traces may be transformed into rewards for the consumption of the AI-assisted compiler 170. The transformation may occur on the server machine 180 or in the AI-assisted compiler 170. The rewards and the traces may be used by the AI-assisted compiler 170 to optimize the quality of the compiled code with an RL framework. In some embodiments, the optimized AI-assisted compiler 170 may be used to compile the source code 160 again to generate a higher quality compiled code to run on the server machine 180. Here, the "compile again" may refer to compile the same source code 160 one more time, or compile a different section of the source code 160.

For consistency and simplicity, the term "runtime" or "runtime system" are used in the specification to refer to a library, a framework, a system, or a platform on which the compiled code runs on, such as the JVM 120 and the server machine 180, and the term "computer program" is used to refer to the code fed into the AI-assisted compiler 170, such as the byte code 110 and the source code 160.

Figure 2:
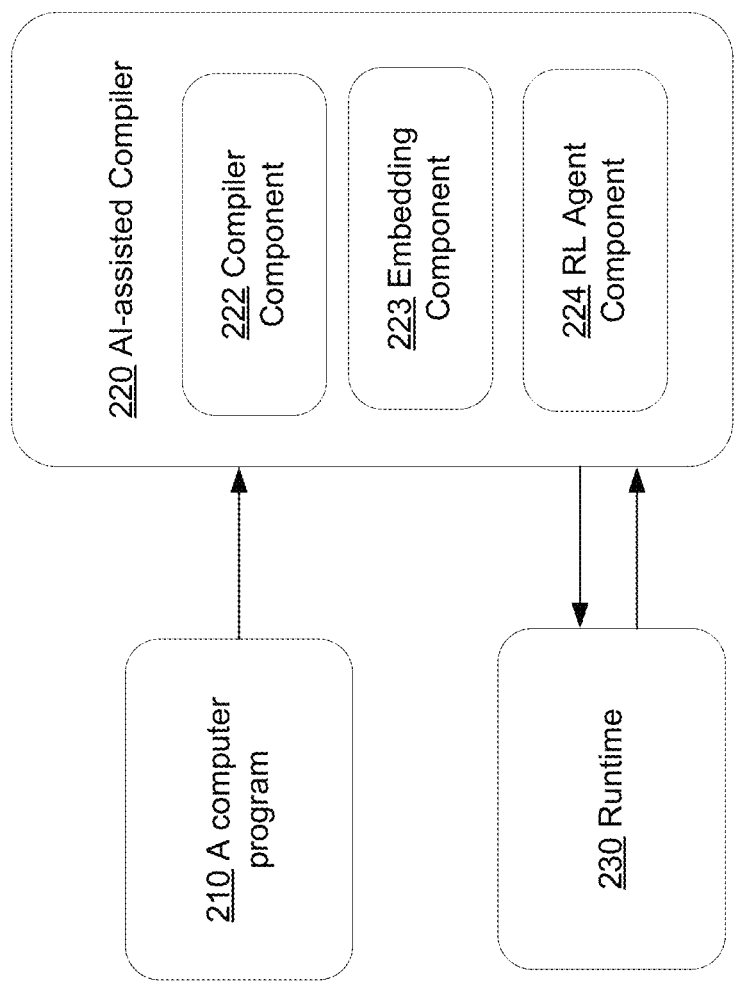
FIG. 2 illustrates an exemplary diagram of an AI-assisted compiler in accordance with some embodiments.

FIG. 2 illustrates an example diagram of an AI-assisted compiler in accordance with some embodiments. The layout of the components in FIG. 2 are for illustrative purposes. Depending on the implementation, the diagram may include fewer, more, or alternative components, and some components may be split or merged. For example, the AI-assisted compiler 220 and the runtime 230 may be implemented within the same hardware domain.

In some embodiments, the computer program 210 may be input into the AI-assisted compiler 220 for compilation. The result of the compilation may include executable code that runs on the runtime 230. The runtime 230 may collect traces or snapshots of the running of the executable code. These traces or snapshots may include various metrics to represent the quality or characteristics of the executable code, such as the size of the executable code, execution time, CIP, or another suitable metric. In some embodiments, these metrics may be translated into rewards by the runtime 230 or by the AI-assisted compiler 220 based on a reward function. The AI-assisted compiler 220 may adjust its behavior (e.g., parameters of an optimization policy) according to the rewards. The objective of the adjustment may include maximizing the rewards, so that the AI-assisted compiler 220 may improve the quality of its compilation of the computer program 210.

In some embodiments, the AI-assisted compiler 220 may include a compiler component 222, an embedding component 223, and an RL agent component 224. Depending on the implementation, the AI-assisted compiler 220 may include more, fewer, or alternative components.

In some embodiments, the compiler component 222 may include a compiler for translating the computer program 210 into executable code that can run on the runtime 230, and the compiler exposes one or more interfaces for receiving and implementing optimization actions to the compiler. The compiler may be static (e.g., low-level virtual machine (LLVM) or GNU Compiler Collection (GCC)) or dynamic (e.g., Just-in-time compilation (JIT) or interpreter). In some embodiments, the compiler in the compiler component 222 may take the computer program 210 as an input and generate intermediate code and executable code as output. The intermediate code and executable code may refer to different types of code on different platforms. For example, if the runtime 230 is a physical machine, the intermediate code may refer to assembly code, and the executable code may refer to binary code. In some embodiments, the intermediate code and the executable code may be generated by generating the intermediate code based on the computer program; obtaining a tree representation of the intermediate code; and generating the executable code by optimizing the tree representation.

In some embodiments, the interfaces exposed by the compiler in the compiler component 222 may be conceptualized as flags. Each flag may correspond to one or more parameters of the compiler. These flags may be toggled as part of optimization applied to the compiler. In some embodiments, the interfaces exposed by the compiler in the compiler component 222 may be in the form of application programming interfaces (APIs), which may accept parameters and implement various optimization configurations to the compiler. In some embodiments, the interfaces are exposed to the RL agent component 224 to implement optimization actions.

In some embodiments, the embedding component 223 may be configured to represent code execution states as an embedding vector that may be input into the RL agent component 224. The term "vector" in this specification may refer to a matrix or another suitable high-dimensional data structure. The embedding may refer to high-dimensional vectors that embed the data flow information and control flow information of the executable code running on the runtime 230. The data flow information may include information like memory references, and the control flow may include information like program execution positions. In some embodiments, the embedding vector may be obtained by obtaining intermediate code and executable code from the compiler in the compiler component 222, which compiles the computer program 210; obtaining a trace from a runtime 230 running the executable code and a reward corresponding to the trace; and generating the embedding vector based on the intermediate code and the trace to represent code execution states. In some embodiments, the trace may be collected periodically according to a predetermined frequency.

In some embodiments, the embedding component 223 may include a Graph Neural Network (GNN). GNNs are connectionist models that capture the dependencies (also called code dependencies) via message passing between the nodes of graphs. Here, the graph may refer to a graph representation of the computer program 210. The graph representation may be generated by various translators or existing methods for constructing graphs from source code. In some embodiments, the embedding vector may be obtained based on the dependencies and the trace obtained from the runtime 230 by generating one or more sequence vectors based on the dependencies and the trace; inputting the one or more sequence vectors into a sequence model to generate the embedding vector. The sequence model may be implemented with a neural network trained to embed the one or more sequence vectors into a fixed-length vector for the consumption of the RL agent component 224.

As described above, in a standard reinforcement learning framework, an agent may take a state of the environment and a reward as the input, and determine actions to move the environment to the next state while maximizing a cumulative reward. Similarly, in the context of AI-assisted compiler 220, the RL agent component 224 may be configured to receive the embedding vector (e.g., vectorized representation) of a code execution state as the state of the environment and a reward corresponding to the code execution state as the input, and determine one or more optimization actions based on the embedding vector and the reward. In some embodiments, the Runtime 230 may compute the reward using a reward function and based on traces collected by running the executable code. The reward may include performance measuring metrics such as execution time, CPI, other suitable metrics, or any combination thereof. In some embodiments, the RL agent component 224 may train an optimization policy for recommending the optimization actions based on the input. In some embodiments, the one or more optimization actions may include at least one of the following: vectorization, instruction ordering, and heuristic feed.

In some embodiments, the RL agent component 224 may be further configured to trigger one or more interfaces exposed by the compiler component 222 to apply the one or more determined optimization actions to update/optimize the compiler. In some embodiments, the applied optimization actions may be evaluated in the next round of compilation and training by re-compiling the computer program 210 (entirely or partially) using the updated compiler, running the generated executable code on the runtime 230, and determining a new reward. The new reward and the state of the environment (e.g., the new code execution state) may be taken by the RL agent component 224 as input to update the optimization policy. In some embodiments, the optimization policy includes a plurality of parameters that can be updated to increase the probabilities of effective optimization actions being recommended, and decrease the probabilities of ineffective optimization actions being recommended.

Figure 3:
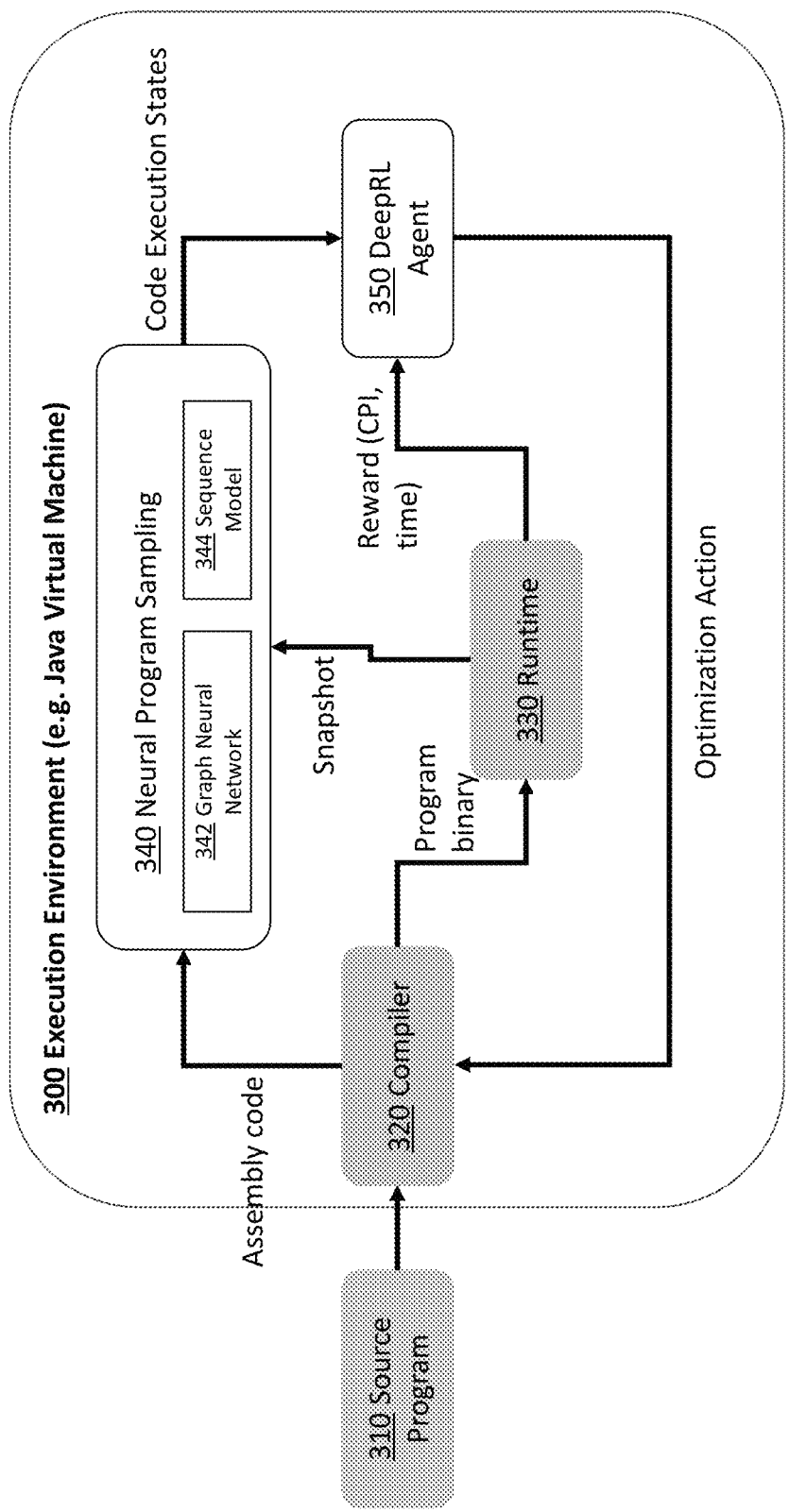
FIG. 3 illustrates an example workflow for compiling a computer program with an AI-assisted compiler in accordance with some embodiments.

FIG. 3 illustrates an example workflow for compiling a computer program with an AI-assisted compiler in accordance with some embodiments. The workflow illustrated in FIG. 3 involves a source program 310 to be compiled and run in an execution environment 300. An exemplary execution environment 300 may include a Java Virtual Machine (JVM).

In some embodiments, the execution environment 300 may include an AI-assisted compiler, which may include one or more components shown in FIG. 3 depending on the implementation. For example, the AI-assisted compiler may refer to a combination of a Neural Program Sampling component 340 and a DeepRL Agent 350. As another example, the AI-assisted compiler may further include a compiler 320, and/or the runtime 330.

In some embodiments, the source program 310 may first be compiled by the compiler 320 to generate assembly code (a form of intermediate code) and a program binary (a form of executable code). The program binary may be sent to the runtime 330 for execution. According to a predetermined schedule, snapshots (a form of the trace) of the execution of the program binary may be collected from the runtime 330. The runtime 330 may generate information that can be learned to measure the performance of the execution of the program binary. For example, some performance metrics such as CPI and execution time may be extracted from the runtime 330 to quantify the performance of the code running in the runtime 330.

In some embodiments, the assembly code from the compiler 320 and the snapshot collected from the runtime 330 may be fed into the Neural Program Sampling component 340 for runtime sampling to obtain a vectorized representation of the code execution states. This vectorized representation may include a high-dimension vector that can be used as an input to the DeepRL Agent 350. In some embodiments, the Neural Program Sampling 340 component may include a plurality of neural networks, such as a Graph Neural Network (GNN) and a Sequence model neural network. For example, the GNN may learn node dependencies in a graph representation of the assembly code. The graph representation may be generated by various translators or existing methods for constructing graphs from source code. Based on the dependencies and the snapshot, one or more vectors representing the code execution states may be generated and fed into the Sequence model neural network to generate a final embedding vector to represent the code execution states.

In some embodiments, the embedding vector of the code execution states may be input into the DeepRL Agent 350 as the state of the environment, and the performance metrics from the runtime 330 may be translated into a reward for the DeepRL Agent 350. In some embodiments, the reward may be computed by the runtime 330 or the DeepRL Agent 350 using a reward function. Based on the state and the reward, the DeepRL Agent 350 may generate one or more recommended optimization actions according to an optimization policy. The optimization policy defines the DeepRL Agent 350's way of behaving at a given time, and includes a mapping from perceived states of the environment to the optimization actions to be taken (e.g., recommended to be implemented in the compiler 320). In some embodiments, the reward may indicate how well the previously recommended optimization actions improve the quality of the code generated by the compiler 320. Based on the reward, the DeepRL Agent 350 may adjust its optimization policy to increase the probabilities of effective optimization actions for the current source program 310, and decrease the probabilities of ineffective optimization actions for the current source program 310.

In some embodiments, the recommended optimization actions may be implemented in the compiler 320 through one or more interfaces exposed by the compiler 320. The exposed interfaces may be conceptualized as flags that can be toggled or implemented as APIs that can be called with parameters. In some embodiments, the optimization of the compiler 320 is an iterative process. For example, after the compiler 320 is updated by implementing the recommended optimization action, the source program 310 may be re-compiled by the updated compiler, which will work with the runtime 330, the Neural Program Sampling 340, and the DeepRL Agent 350 to further adjust the optimization policy of the DeepRL Agent 350 and recommend more optimization actions for improving the performance of the compiler 320. In some embodiments, each iteration may compile a section of the source program 310. For example, if the source program 310 may generate a plurality of .o files (object code), one iteration may compile a first set of .o files, and the next iteration may use the updated compiler 320 to compile a second set of .o files. In some embodiments, each iteration may compile the entire source program 310. In some embodiments, the iterative optimization process may be terminated when an exit condition is met. Example exit condition includes that the compiled code meets a target quality or the RL agent decides to terminate (e.g., when the reinforcement learning converges, or when a number of iterations are performed).

Figure 4:
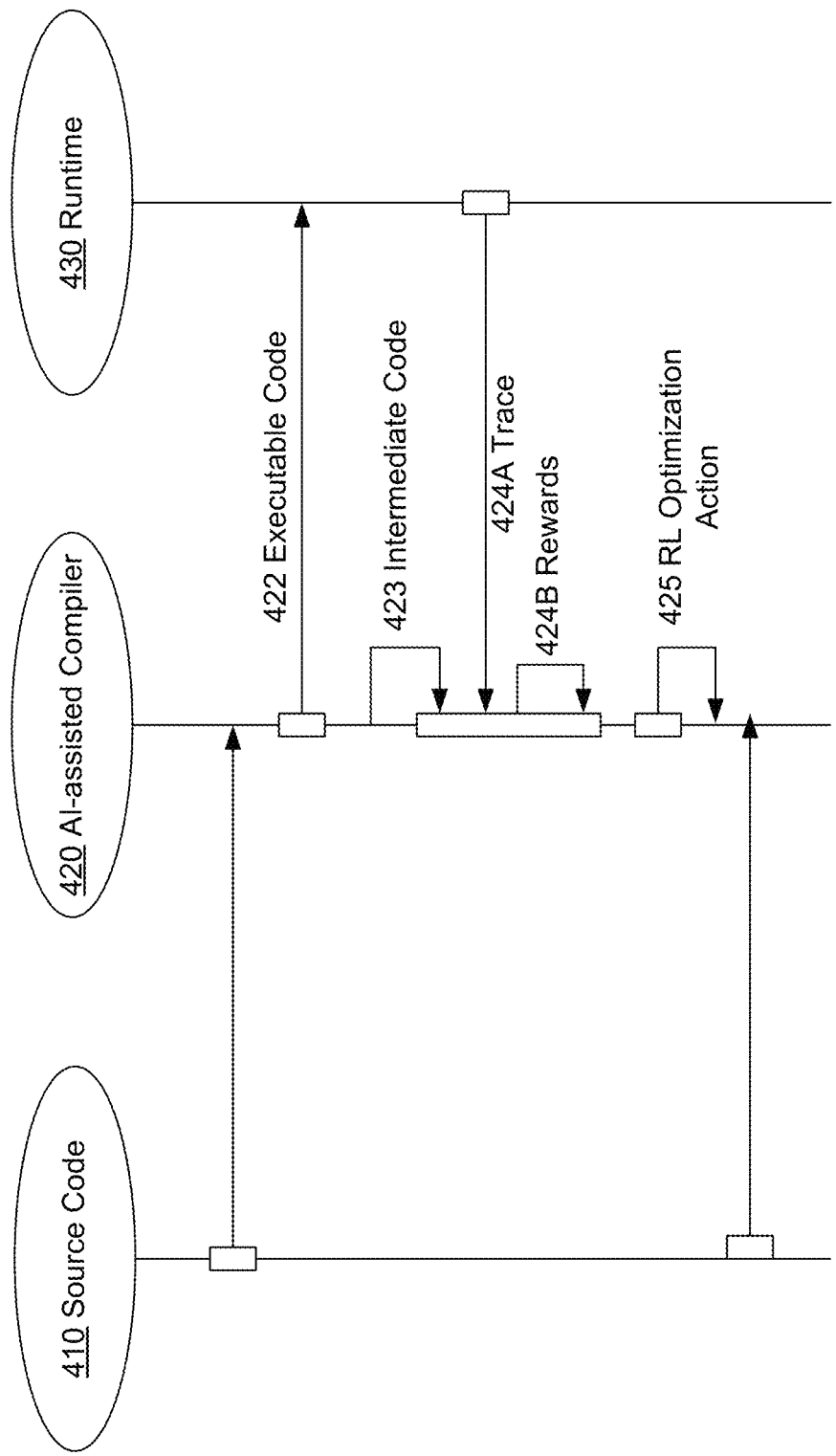
FIG. 4 illustrates an example method for compiling a computer program with an AI-assisted compiler in accordance with some embodiments.

FIG. 4 illustrates an example method for compiling a computer program with an AI-assisted compiler in accordance with some embodiments. The example method in FIG. 4 involves an AI-assisted compiler 420 compiling a source code 410 written in a high-level programming language into executable code running on a runtime 430. In some embodiments, the source code 410 may refer to one or more files in one or more programming projects that may be compiled in batches. In some embodiments, the source code 410 may be compiled in its entirety during each compilation. In either case, the AI-assisted compiler 420 may employ reinforcement learning and iteratively improve the quality of the executable code it generates.

In some embodiments, the entire source code 410 or a section of the source code 410 may be sent to the AI-assisted compiler 420 for compilation. The AI-assisted compiler 420 may generate intermediate code 423 and executable code 422 by generating the intermediate code 423 based on the received source code 410; obtaining a tree representation of the intermediate code 423; and generating the executable code 422 by optimizing the tree representation.

In some embodiments, the executable code 422 may be executed in the runtime 430. Example runtime 430 includes a physical computing device or a virtual machine or device. During the execution of the executable code 422, the runtime 430 may collect traces (with information related to code execution states) from which some execution performance metrics may be extracted. Example performance metrics include execution time, CPI, miss per accruing instruction, etc. In the context of reinforcement learning, these performance metrics may be the basis for computing rewards.

In some embodiments, the runtime 430 may feed the trace 424A back to the AI-assisted compiler 420. The trace 424A may be the basis for an RL agent in the AL compiler 420 to compute a reward corresponding to the trace. In some embodiments, the RL agent may refer to a deep Q-learning neural network (DQN) agent, a Q-learning agent, or another suitable agent. In some embodiments, the AI-assisted compiler 420 may perform embedding operations based on the intermediate code 423 and the trace 424A to generate a vectorized representation of the code execution states. The vectorized representation may be in the form of a high-dimension vector that can be fed into the RL agent in the AI-assisted compiler 420. The RL agent is configured to learn an optimization policy for recommending optimization actions 425 to the AI-assisted compiler 420 to maximize a cumulative reward.

As pointed out above, the optimization of the AI-assisted compiler 420 is an iterative process. During a first iteration, one or more optimization actions 425 may be recommended by the RL agent based on the optimization policy. The AI-assisted compiler 420 may implement the one or more optimization actions 425 in order to produce executable code with higher quality. The definition of "quality" may vary depending on the use cases. For instance, some use cases may desire a faster execution time, while other use cases may desire execution code in a smaller size. Afterward, the updated AI-assisted compiler 420 may perform compilation in a next iteration. If the newly generated intermediate code 423 and the newly obtained trace 424A show that some of the implemented optimization actions improve the quality of the newly generated executable code, the RL agent of the AI-assisted compiler 420 may adjust the parameters of the optimization policy to increase the probabilities of the optimization actions or similar actions being recommended. If the newly generated intermediate code 423 and the newly obtained trace 424A show that some of the implemented optimization actions fail to improve the quality of the newly generated executable code, the RL agent of the AI-assisted compiler 420 may adjust the parameters of the optimization policy to decrease the probabilities of the optimization actions or similar actions being recommended. In some embodiments, the iterative optimization process may be terminated when an exit condition is met. Example exit condition includes that the executable code 422 (or another form of compiled code) meets a target quality or the RL agent decides to terminate (e.g., when the reinforcement learning converges, or when a number of iterations is reached).

FIG. 5 illustrates an example method 500 of an AI-assisted compiler in accordance with various embodiments. The method 500 may be implemented in an environment shown in FIG. 1. The method 500 may be performed by a device, apparatus, or system illustrated by FIGS. 1-4, such as system 102. Depending on the implementation, the method 500 may include additional, fewer, or alternative steps performed in various orders or parallel.

Block 510 includes obtaining intermediate code and executable code generated by compiling a computer program with a compiler. In some embodiments, the compiler comprises a plurality of interfaces, and the updating the compiler comprises: triggering one or more of the plurality of interfaces to apply the one or more optimization actions to the compiler. In some embodiments, the obtaining intermediate code and executable code comprises: generating the intermediate code based on the computer program; obtaining a tree representation of the intermediate code; and generating the executable code by optimizing the tree representation.

Block 520 includes determining a reward based on one or more traces obtained by executing the executable code in a runtime system. In some embodiments, the runtime system is implemented in at least one of the following: a computing device with an operating system, a virtual machine, a cloud-native compiler-as-a-service platform, or a feedback-driven optimization compiler framework. In some embodiments, the each of the one or more traces comprises one or more metrics including at least one of the following: cycles per instruction (CPI), execution time, or miss per accruing instruction. In some embodiments, the determination of the reward may be performed by the runtime system or a cloud-native compiler-as-a-service platform.

Block 530 includes generating an embedding vector based on the intermediate code and the one or more traces to represent code execution states. In some embodiments, the generating the embedding vector based on the intermediate code and the one or more traces comprises: generating a graph representation of the intermediate code; learning code dependencies based on the graph by a Graph Neural Network (GNN); and generating the embedding vector based on the code dependencies and the one or more traces to represent the code execution states. In some embodiments, the generating the embedding vector based on the code dependencies and the one or more traces comprises: generating one or more sequence vectors based on the code dependencies and the one or more traces; inputting the one or more sequence vectors into a Sequence Model to generate the embedding vector.

Block 540 includes determining, using a reinforcement learning agent, one or more optimization actions based on the embedding vector and the reward. In some embodiments, the reinforcement learning agent trains an optimization policy for recommending optimization actions, and the method further comprises: obtaining new executable code from the updated compiler; obtaining one or more new traces and a new reward by running the new executable code in the runtime system; and training the optimization policy based on the new reward and the one or more optimization actions.

Block 550 includes updating the compiler by applying the one or more optimization actions.

In some embodiments, the obtaining intermediate code and executable code comprises obtaining the intermediate code and the executable code after the compiler compiling the computer program, and the method 500 further comprises triggering the updated compiler to recompile the computer program.

In some embodiments, the computer program comprises a plurality of sections, and the obtaining intermediate code and executable code comprises obtaining the intermediate code and the executable code by compiling a first section of the computer program by the compiler, and the method 500 further comprises compiling a second section of the computer program with the updated compiler.

Figure 6:
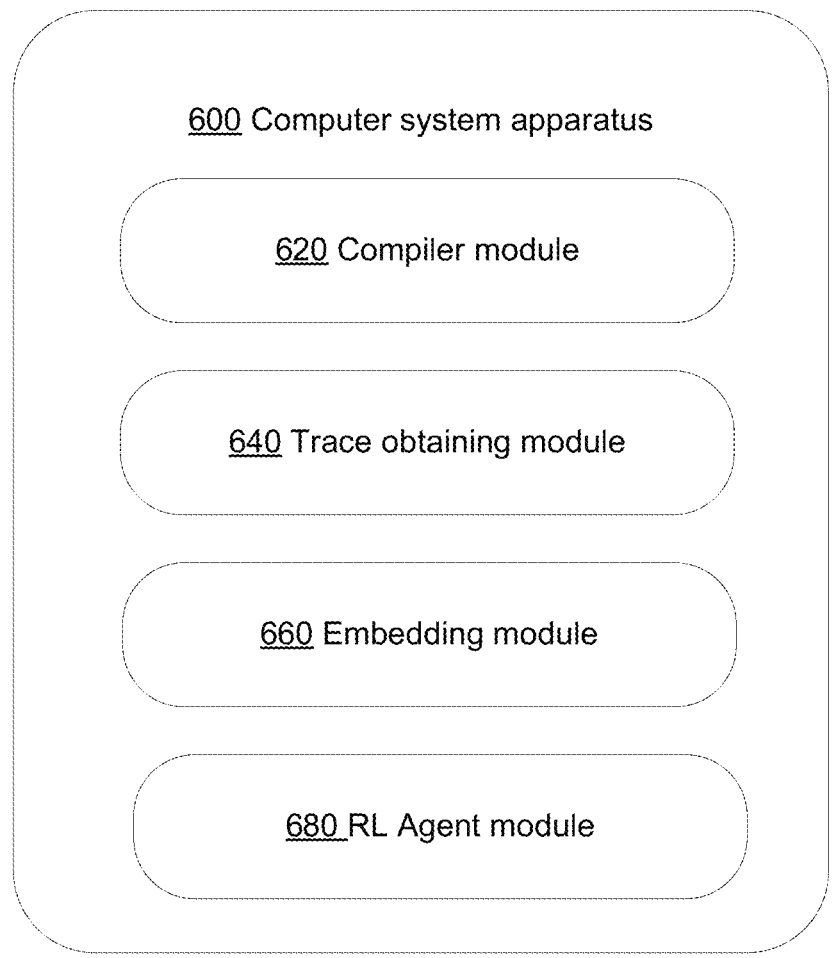
FIG. 6 illustrates a block diagram of a computer apparatus of an AI-assisted compiler in accordance with some embodiments.

FIG. 6 illustrates a block diagram of a computer apparatus 600 for task control based on Bayesian meta-reinforcement learning in accordance with some embodiments. The components of the computer system 600 presented below are intended to be illustrative. Depending on the implementation, the computer system 600 may include additional, fewer, or alternative components.

The computer apparatus 600 may be an example of an implementation of the AI-assisted compiler 220 of FIG. 2. The computer apparatus 600 may include one or more processors and one or more non-transitory computer-readable storage media (e.g., one or more memories) coupled to the one or more processors and configured with instructions executable by the one or more processors to cause the system or device (e.g., the processor) to perform the above-described embodiments. The computer apparatus 600 may include various units/modules corresponding to the instructions (e.g., software instructions).

In some embodiments, the computer apparatus 600 may be referred to as an apparatus of an AI-assisted compiler. The apparatus may include a compiler module 620, a trace obtaining model 640, an embedding module 660, and an RL module 680. In some embodiments, the compiler module 620 may be configured to obtain intermediate code and executable code generated by compiling a computer program with a compiler. In some embodiments, the trace obtaining model 640 may be configured to collect one or more traces obtained by executing the executable code in a runtime system and determine a reward based on the one or more traces. In some embodiments, the embedding module 660 may be configured to generate an embedding vector based on the intermediate code and the one or more traces to represent code execution states. In some embodiments, the RL module 680 may be configured to determine one or more optimization actions based on the embedding vector and the reward and update the compiler by applying the one or more optimization actions.

Figure 7:
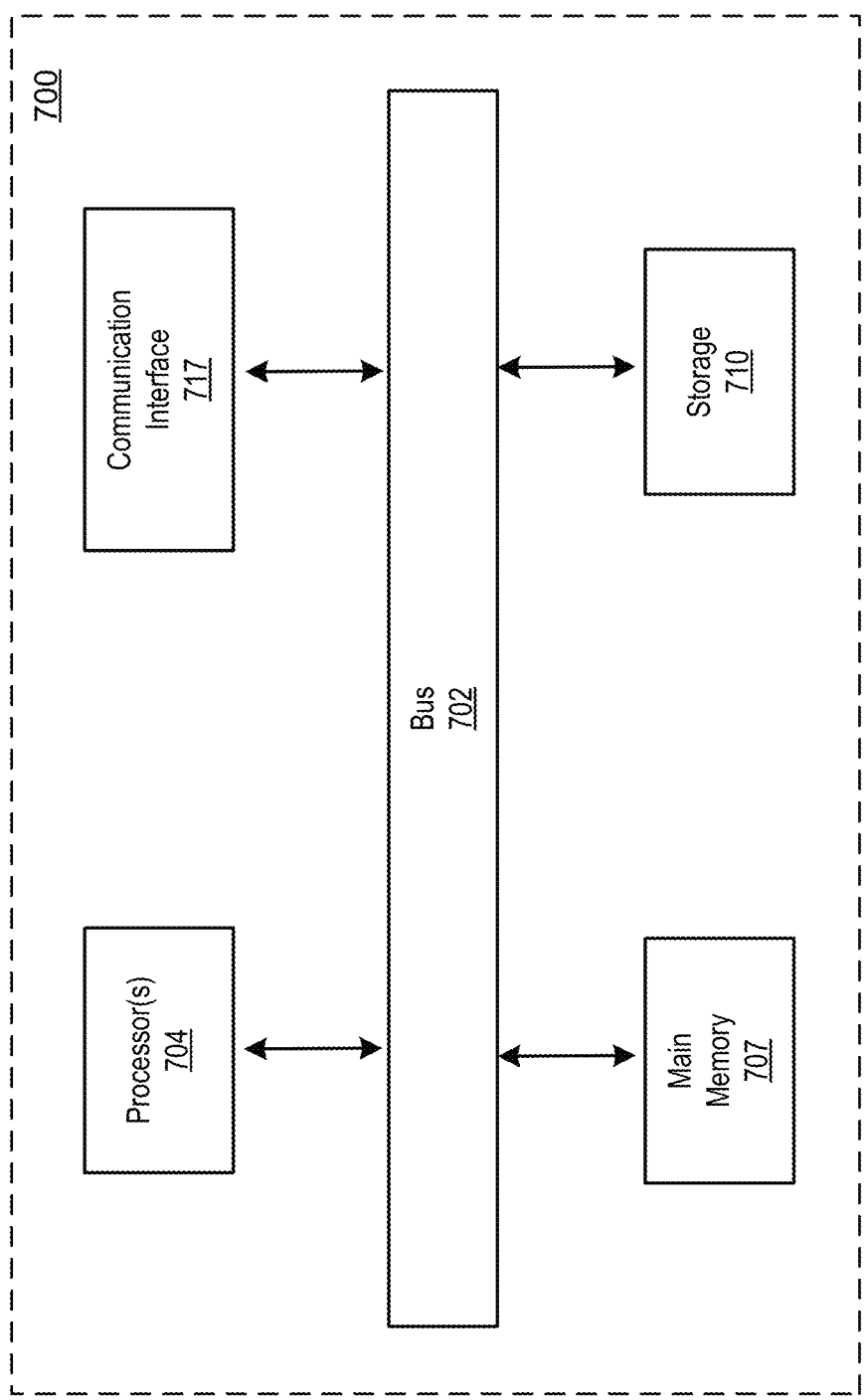
FIG. 7 illustrates an example block diagram of a computer system in which any of the embodiments described herein may be implemented.

FIG. 7 illustrates an example block diagram of a computer system in which any of the embodiments described herein may be implemented. The computing device may be used to implement one or more components of the systems and the methods shown in FIGS. 1-6. The computing device 700 may comprise a bus 702 or other communication mechanisms for communicating information and one or more hardware processors 704 coupled with bus 702 for processing information. Hardware processor(s) 704 may be, for example, one or more general-purpose microprocessors.

The computing device 700 may also include a main memory 707, such as random-access memory (RAM), cache and/or other dynamic storage devices 710, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 710. Execution of the sequences of instructions contained in main memory 707 may cause the processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing device 700 also includes a communication interface 717 coupled to bus 702. Communication interface 717 may provide a two-way data communication coupling to one or more network links that are connected to one or more networks. As another example, communication interface 717 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, where the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or sections of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method, comprising:
    obtaining intermediate code and executable code generated by compiling a computer program with a compiler;
    determining a reward based on one or more traces obtained by executing the executable code in a runtime system;
    generating an embedding vector based on the intermediate code and the one or more traces to represent code execution states;
    determining, using a reinforcement learning agent, one or more optimization actions based on the embedding vector and the reward; and
    updating the compiler by applying the one or more optimization actions.

2. The method of claim 1, wherein the compiler comprises a plurality of interfaces, and the updating the compiler comprises:
    triggering one or more of the plurality of interfaces to apply the one or more optimization actions to the compiler.

3. The method of claim 1, wherein the generating the embedding vector based on the intermediate code and the one or more traces comprises:
    generating a graph representation of the intermediate code;
    learning code dependencies based on the graph representation of the intermediate code by using a Graph Neural Network (GNN); and
    generating the embedding vector based on the code dependencies and the one or more traces to represent the code execution states.

4. The method of claim 3, wherein the generating the embedding vector based on the code dependencies and the one or more traces comprises:
    generating one or more sequence vectors based on the code dependencies and the one or more traces;
    inputting the one or more sequence vectors into a Sequence Model to generate the embedding vector.

5. The method of claim 1, wherein the runtime system is implemented in at least one of the following: a computing device with an operating system, a virtual machine, a cloud-native compiler-as-a-service platform, or a feedback-driven optimization compiler framework.

6. The method of claim 1, wherein the each of the one or more traces comprises one or more metrics including at least one of the following: cycles per instruction (CPI), execution time, or miss per accruing instruction.

7. The method of claim 1, wherein the obtaining intermediate code and executable code comprises:
    generating the intermediate code based on the computer program;
    obtaining a tree representation of the intermediate code; and
    generating the executable code by optimizing the tree representation.

8. The method of claim 1, wherein:
    the obtaining intermediate code and executable code comprises obtaining the intermediate code and the executable code after the compiler compiling the computer program, and
    the method further comprises triggering the updated compiler to re-compile the computer program.

9. The method of claim 1, wherein the computer program comprises a plurality of sections, and wherein:
    the obtaining intermediate code and executable code comprises obtaining the intermediate code and the executable code by compiling a first section of the computer program by the compiler, and the method further comprises compiling a second section of the computer program with the updated compiler.

10. The method of claim 1, wherein the reinforcement learning agent trains an optimization policy for recommending optimization actions, and the method further comprises:
obtaining new executable code from the updated compiler;
obtaining one or more new traces and a new reward by running the new executable code in the runtime system; and
training the optimization policy based on the new reward and the one or more optimization actions.

11. A system comprising one or more processors and one or more non-transitory computer-readable memories coupled to the one or more processors, the one or more non-transitory computer-readable memories storing instructions that, when executed by the one or more processors, cause the system to perform operations comprising:
obtaining intermediate code and executable code generated by compiling a computer program with a compiler;
determining a reward based on one or more traces obtained by executing the executable code in a runtime system;
generating an embedding vector based on the intermediate code and the one or more traces to represent code execution states;
determining, using a reinforcement learning agent, one or more optimization actions based on the embedding vector and the reward; and
updating the compiler by applying the one or more optimization actions.

12. The system of claim 11, wherein the generating the embedding vector based on the intermediate code and the one or more traces comprises:
generating a graph representation of the intermediate code;
learning code dependencies based on the graph representation of the intermediate code by using a Graph Neural Network (GNN); and
generating the embedding vector based on the code dependencies and the one or more traces to represent the code execution states.

13. The system of claim 12, wherein the generating the embedding vector based on the code dependencies and the one or more traces comprises:
generating one or more sequence vectors based on the code dependencies and the one or more traces;
inputting the one or more sequence vectors into a Sequence Model to generate the embedding vector.

14. The system of claim 11, wherein:
the obtaining intermediate code and executable code comprises obtaining the intermediate code and the executable code after the compiler compiling the computer program, and
the operations further comprise triggering the updated compiler to re-compile the computer program.

15. The system of claim 11, wherein the computer program comprises a plurality of sections, and wherein:
the obtaining intermediate code and executable code comprises obtaining the intermediate code and the executable code by compiling a first section of the computer program by the compiler, and
the operations further comprise compiling a second section of the computer program with the updated compiler.

16. A non-transitory computer-readable storage medium configured with instructions executable by one or more processors to cause the one or more processors to perform operations comprising:
obtaining intermediate code and executable code generated by compiling a computer program with a compiler;
determining a reward based on one or more traces obtained by executing the executable code in a runtime system;
generating an embedding vector based on the intermediate code and the one or more traces to represent code execution states;
determining, using a reinforcement learning agent, one or more optimization actions based on the embedding vector and the reward; and
updating the compiler by applying the one or more optimization actions.

17. The non-transitory computer-readable storage medium of claim 16, wherein the generating the embedding vector based on the intermediate code and the one or more traces comprises:
generating a graph representation of the intermediate code;
learning code dependencies based on the graph representation of the intermediate code by using a Graph Neural Network (GNN); and
generating the embedding vector based on the code dependencies and the one or more traces to represent the code execution states.

18. The non-transitory computer-readable storage medium of claim 17, wherein the generating the embedding vector based on the code dependencies and the one or more traces comprises:
generating one or more sequence vectors based on the code dependencies and the one or more traces;
inputting the one or more sequence vectors into a Sequence Model to generate the embedding vector.

19. The non-transitory computer-readable storage medium of claim 16, wherein:
the obtaining intermediate code and executable code comprises obtaining the intermediate code and the executable code after the compiler compiling the computer program, and
the operations further comprise triggering the updated compiler to re-compile the computer program.

20. The non-transitory computer-readable storage medium of claim 16, wherein the computer program comprises a plurality of sections, and wherein:
the obtaining intermediate code and executable code comprises obtaining the intermediate code and the executable code by compiling a first section of the computer program by the compiler, and
the operations further comprise compiling a second section of the computer program with the updated compiler.

* * * * *